(12) United States Patent
Cronje et al.

(10) Patent No.: US 11,948,348 B2
(45) Date of Patent: Apr. 2, 2024

(54) OPERATOR BEHAVIOR MONITORING SYSTEM

(71) Applicant: 5DT, Inc., Orlando, FL (US)

(72) Inventors: Jaco Cronje, Zwavelpoort (SA); Johann Ephraim Hough, Brooklyn (SA); Willie Moller, Monument Park (SA); Riaan Van Rensburg, Halfway Gardens (SA); Paul Olckers, Faerie Glen X6 (SA)

(73) Assignee: 5DT, Inc., Orlando, FL (US)

( * ) Notice: Subject to any disclaimer, the term of this patent is extended or adjusted under 35 U.S.C. 154(b) by 152 days.

(21) Appl. No.: 17/257,550

(22) PCT Filed: Oct. 23, 2019

(86) PCT No.: PCT/IB2019/059065
§ 371 (c)(1),
(2) Date: Dec. 31, 2020

(87) PCT Pub. No.: WO2020/084518
PCT Pub. Date: Apr. 30, 2020

(65) Prior Publication Data
US 2021/0287539 A1    Sep. 16, 2021

Related U.S. Application Data

(60) Provisional application No. 62/749,190, filed on Oct. 23, 2018.

(51) Int. Cl.
| | | |
|---|---|---|
| G06V 10/82 | (2022.01) | |
| G06F 18/214 | (2023.01) | |
| G06F 18/2415 | (2023.01) | |
| G06V 10/94 | (2022.01) | |
| G06V 20/59 | (2022.01) | |

(Continued)

(52) U.S. Cl.
CPC ............ G06V 10/82 (2022.01); G06F 18/214 (2023.01); G06F 18/2415 (2023.01);

(Continued)

(58) Field of Classification Search
CPC ...... G06V 10/82; G06V 20/597; G06V 10/95; G06F 18/214; G06F 18/2415; G08G 1/13; H04L 67/12

(Continued)

(56) References Cited

U.S. PATENT DOCUMENTS

2015/0339527 A1* 11/2015 Plummer ................ G06F 3/013
348/78
2016/0140424 A1* 5/2016 Wang .................... G06F 18/214
382/156

(Continued)

OTHER PUBLICATIONS

International Search Report from related PCT application No. PCT/IB19/59065, dated Mar. 10, 2020; 3 pgs.

(Continued)

*Primary Examiner* — Kerri L McNally
(74) *Attorney, Agent, or Firm* — Greenberg Traurig, LLP (57) ABSTRACT

An operator behavior monitoring system, which includes: an operator behavior recognition system comprising hardware including a processor, a data storage facility and input/output interfaces, the system being configured to implement a set of convolutional neural networks including: an object detection group for detecting an object in the image and to delineate the object from the image; a feature extraction group which extracts features of the object detected by the object detection group; a classifier group which assess the features and classifying the features into a events and which is operable to report the events to a remote server; a server operable to communicate with the operator behavior recognition system for receiving predefined events detected by the operator behavior recognition system; a database in communication with the server, operable to store and retrieve detected operator incidents; and a web frontend, in communication with the server for interfacing with the server.

20 Claims, 4 Drawing Sheets

Block Diagram of the Operator Attentiveness Evaluation System (51) Int. Cl.
  *G08G 1/13* (2006.01)
  *H04L 67/12* (2022.01)
  *G06V 10/20* (2022.01)
  *G06V 10/80* (2022.01)
  *G06V 40/10* (2022.01)
  *G06V 40/16* (2022.01)

(52) U.S. Cl.
  CPC ............ *G06V 10/95* (2022.01); *G06V 20/597* (2022.01); *G08G 1/13* (2013.01); *H04L 67/12* (2013.01); *G06V 10/255* (2022.01); *G06V 10/809* (2022.01); *G06V 40/11* (2022.01); *G06V 40/161* (2022.01)

(58) Field of Classification Search
  USPC ......................................................... 340/990
  See application file for complete search history.

(56) References Cited

U.S. PATENT DOCUMENTS

| | | | |
|---|---|---|---|
| 2017/0200061 A1* | 7/2017 | Julian | G08G 1/0112 |
| 2018/0126901 A1* | 5/2018 | Levkova | B60W 40/09 |
| 2018/0181809 A1* | 6/2018 | Ranjan | G06V 10/82 |
| 2018/0189581 A1* | 7/2018 | Turcot | G06V 10/454 |

OTHER PUBLICATIONS

Written Opinion from related PCT application No. PCT/IB19/59065, dated Mar. 10, 2020; 7 pgs.

\* cited by examiner

Figure 1: Block Diagram of the Operator Attentiveness Evaluation System

Figure 2: Typical Information Displayed for Operator Attentiveness Evaluation System Figure 3: Typical Web App View Figure 4: Generic Process Diagram of the Method to Detect Objects and Actions

OPERATOR BEHAVIOR MONITORING SYSTEM

CROSS-REFERENCE TO RELATED APPLICATION(S) INFORMATION

The present application is a U.S. national stage patent application, pursuant to 35 U.S.C. § 371, of PCT International Application No. PCT/IB2019/059065, filed Oct. 23, 2019, published as WO2020/084518A1, which claims priority to U.S. provisional patent application No. 62/749,190, filed Oct. 23, 2018, the contents of all of which are hereby incorporated by reference in their entirety.

TECHNICAL FIELD

This invention relates to an operator behavior monitoring system and a machine-implemented method for monitoring operator behavior.

BACKGROUND

In order to prevent incidents, accidents and undesired consequences, it is important to monitor operators that perform work where vigilance and attentiveness are required. Historically this was done by having someone monitor the operators in person or from a remote location using sensors such as cameras. This is prone to error as the person monitoring has to remain vigilant too and monitor multiple operators simultaneously.

A system is needed that is able to accurately monitor operators in real time and alert both the operators and their supervisors when the operators are not vigilant.

The inventors identified a need to monitor operators remotely and to raise an alarm remotely when intervention is required.

SUMMARY OF THE DISCLOSURE

According to a first aspect of the invention, there is provided an operator behavior monitoring system, which includes:
  an operator behavior recognition system comprising hardware including at least one processor, a data storage facility in communication with the processor and input/output interfaces in communication with the processor, the system being configured to implement a set of convolutional neural networks (CNNs) including:
    an object detection group into which at least one image is received from an image source for detecting at least one object in the image and to delineate the object from the image for further processing;
    a feature extraction group which extracts features of the at least one object detected by the object detection group, the features including key points, orientation, descriptors and other features of the at least one object;
    a classifier group which assess the features extracted by the feature extraction group and classifying the features into a predefined number of events and which is operable to report the events to a remote server;
  a server operable to communicate with the operator behavior recognition system for receiving predefined events detected by the operator behavior recognition system, the server being in communication with a web frontend and a database;
  a database in communication with the server, operable to store and retrieve detected operator incidents; and
  a web frontend, in communication with the server for interfacing with the server.

The classifier group may include any one or both of two additional classifiers being:
  a single image CNN of the at least one object;
  a single image CNN of the at least one object in combination with a long-term-short-term memory (LSTM) recurrent network, which keeps a memory of a series of previous images of the at least one object.

The classifier group may include an ensemble function to ensemble the outputs of the classifiers together with the output of the single image CNN of the at least one object together with the combination of the single image CNN and the LSTM recurrent network by a weighted sum of the three classifiers where the weights are determined by optimizing the weights on the training dataset. The ensembled output from the classifiers is used to detect a predefined event, which is indicative of operator behaviour.

The classifier group may be pre-trained with classifiers which takes as input a combination of objects detected by the object detection group to detect a number of predefined events.

According to another aspect of the invention, there is provided a machine-implemented method for monitoring operator behavior, which includes:
  receiving onto an operator behavior recognition system via an input/output interface onto a processor at least one image from an image source, the operator behavior recognition system comprising hardware including at least one processor, a data storage facility in communication with the processor and input/output interfaces in communication with the processor, the system being configured to implement a set of convolutional neural networks (CNNs) including:
    an object detection group into which at least one image is received from an image source for detecting at least one object in the image and to delineate the object from the image for further processing;
    a feature extraction group which extracts features of the at least one object detected by the object detection group, the features including key points, orientation, descriptors and other features of the at least one object;
    a classifier group which assess the features extracted by the feature extraction group and classifying the features into a predefined number of events and which is operable to report the events to a remote server;
  processing the at least one image by the object detection group to detect at least one object in the image and to delineate the object from the image for further processing;
  processing the at least one image of at least one object by means of the feature extraction group to extract features of the at least one object; and
  processing an output from the feature extraction group by means of the classifier group to detect a number of predefined events and transmitting the predefined events to a server;
  on a server receiving predefined events detected by the operator behavior recognition system; and
  on a database in communication with the server recording the data and the detected events.

The database may also record all data being generated by the operator behavior recognition system.

The method may include the additional step of displaying events detected by the operator behavior recognition system on the web frontend.

The step of displaying events detected by the operator behavior recognition system may include determining the probability of events and displaying the probability of such events in a set of graphs indicating the probability of each event. The graphs may be in the form of dynamic bar graphs, dials, and the like.

The step of displaying events detected by the operator behavior recognition system includes periodically recording the geolocation of the operator to determine a route of the operator and displaying a map of the route together with at least one marker on the route indicating the location at which an event was detected.

The marker may include a description of the event, or may be representative of the event.

The predefined events may include any one or more of:
- mobile device use (e.g. talking and/or texting and/or viewing);
- attentiveness and drowsiness;
- hands near face detection;
- eyes off road detection;
- personal protective equipment (PPE) detection (such as, but not limited to, safety glasses, reflective vests, hard hats, ear protection);
- facial recognition of operators and/or occupants;
- hours of service (such as, but not limited to, how long an operator has been busy at a task and whether breaks were taken);
- safety belt (seat belt) detection;
- unauthorized occupant or operator detection;
- number of occupants/operators detection;
- unauthorized object detection (such as, but not limited to, guns or knives);
- mirror check detection;
- unauthorized activity detection (such as, but not limited to, drinking, smoking, eating or makeup application);
- cargo monitoring; and
- dark glasses detection.

DETAILED DESCRIPTION

Overview

Figure 1:
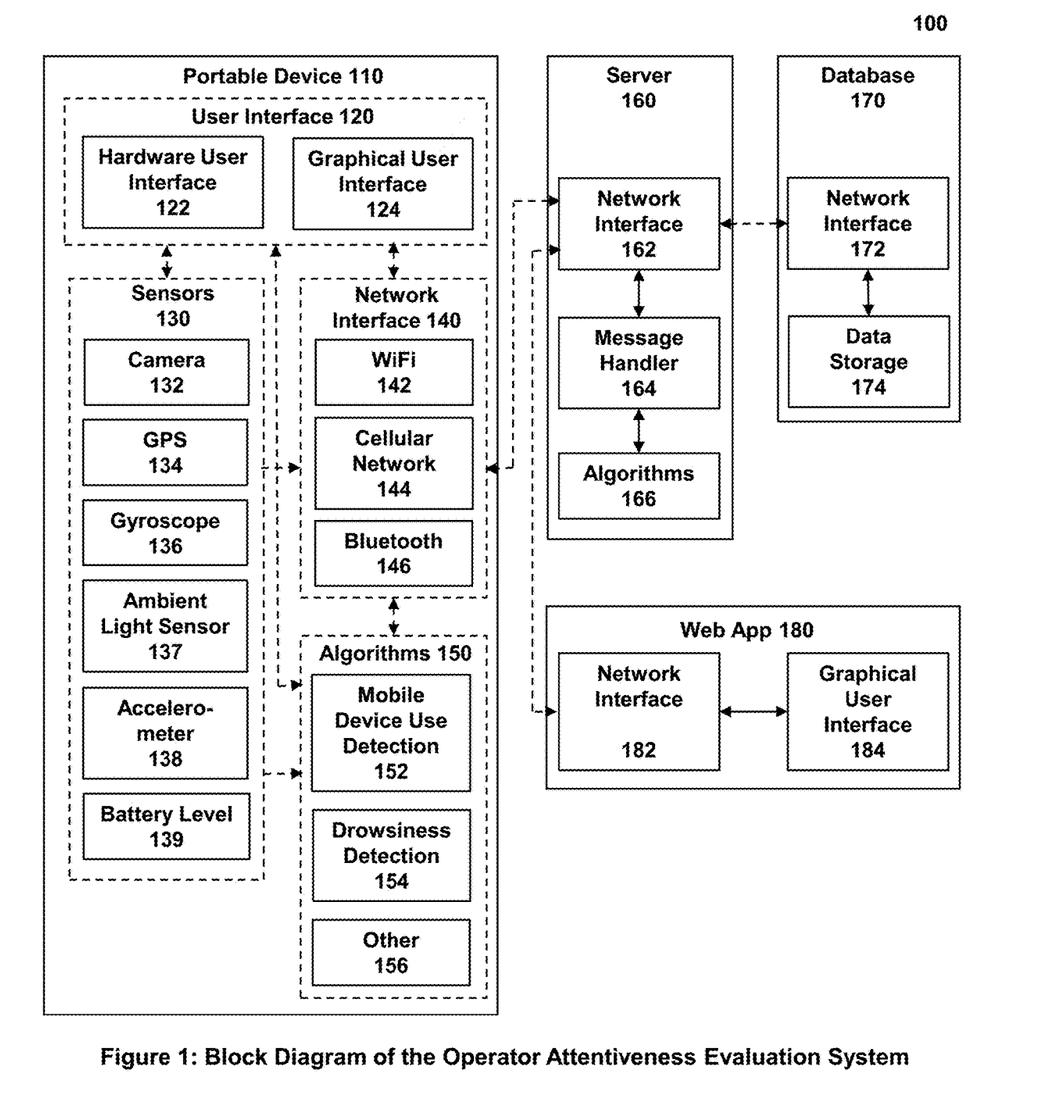
FIG. 1 shows a block diagram of an operator behavior monitoring system in accordance with one aspect of the invention.

A block diagram of the operator behavior monitoring system is shown in FIG. 1. The system makes use of advanced computer vision and machine learning technologies to monitor operators in real time without the aid of humans. It captures footage of an operator from one or more cameras (132) and runs a number of algorithms (150) on the data. Information from other data sources such as global positioning systems (GPS) (134), ambient light sensors (137), accelerometers (138) or gyroscopes (136) may also be used as inputs to the algorithms. This allows the system to determine the state of the operator, including but not limited to drowsiness and vigilance levels. The system uses this information to determine whether an alert should be generated in order to correct an undesired state of the operator. Additionally, the information collected by the system is sent to an online server (160) using an internet connection. This allows operators to be monitored in real time. The data is also sent to a database (170) where it is stored to be retrieved and reviewed at a later time. The stored data can then be accessed through either a graphical user interface (GUI) (124) on the portable device (110) or a web application (web app) (180) that displays the data and allows a user to view and interact with it.

As shown in FIG. 1, the system consists of four primary subsystems, namely, a portable device (110), server (160), database (170) and web app (180). These subsystems communicate through network interfaces (140, 162, 172 and 182) and a predefined communication protocol.

1. Portable Device/Operator Behavior Recognition System (110)

FIG. 1 shows an operator behavior monitoring system (100) comprising hardware in the form of an operator behavior recognition system, defined by a portable device (110). The portable device (110) includes a processor (not shown), a data storage facility/memory (not shown) in communication with the processor and input/output interfaces in communication with the processor.

The portable device gathers data from sensors (130), runs algorithms (150), such as, but not limited to, mobile device use detection (152) and drowsiness detection (154) on the collected data and sends the collected data and/or algorithm results to the server (160).

The device interfaces with multiple sensors that may be built into the device or connected to it externally using either a wired or wireless connection. The type and number of sensors used will vary depending on the nature of the algorithms that are running.

The sensors that may be used include, but are not limited to, cameras (132) (visible and non-visible spectrums), global positioning system (GPS) (134), ambient light sensors (137), accelerometers (138), gyroscopes (136) and battery level (139) sensors. The sensors may either send raw or processed data to the algorithms to be analysed. The sensors may also send data directly to the server to be stored in the database or be processed on the server.

Various algorithms (150) may be used to process and interpret the sensor data. The algorithms (150) may use data obtained directly from the sensors and data obtained from the server or other algorithms (156).

The network interface (140) is used to send algorithm results or sensor data to the server. It may also receive data from the server and supply it to the algorithms. The network interface may use any implementation or communication protocol that allows communication between two or more devices. This includes, but is not limited to, Wi-Fi (142), cellular networks (GSM, HSPA, LTE) (144) and Bluetooth (146).

The portable device may also include a user interface (UI) (120) that may consist of a hardware user interface (HUI) (122) and/or a graphical user interface (GUI) (124). The UI can be used to log in to the system, control it and view information collected by it.

2. Server (160)

The server (160) is used as the central communication channel for all the subsystems. The portable devices, database, and web app all communicate with each other through the server (160). The server (160) acts as a message handler (164) by routing data to the systems that require it or request it. For example, data that is received from a portable device (110) may be sent to the database (170), the web app (180), or both, depending on whether a request has been made to view the data in real-time on the web app and whether the data has been flagged to be stored.

The server (160) also allows algorithms (166) to be run on data sent to it from a portable device (110) or data stored in the database (170). This removes some of the computing burdens from the portable device (110). It also allows algorithms (166) to be run at a later stage if their results are requested instead of running in real-time.

3. Database (170)

The database (170) receives data from the server (160) and stores it to be accessed at a later stage. The database (170) includes a network interface (172) and data storage (174). The data includes, but is not limited to, sensor data, algorithm results and user information. The database also supplies the server (160) with any of the stored data when it is requested.

4. Web Application (Web App)/Web Frontend (180)

The web app (180) acts as the primary interface to the system and includes several features. The web app includes a network interface (182) and a graphical user interface (184). Access to these features can be granted to specific users or user groups. It establishes a connection with the server (160) which allows it to communicate with the database (170) and portable devices (110).

The web app allows users to be monitored remotely in real time by displaying sensor data and algorithm results. The data may be shown as raw data, or it may be processed and displayed in a user-friendly manner on the web app. For example, data collected while a user is driving may be displayed on a map with alerts shown at the locations where they were generated. Data stored on the database may also be retrieved and shown in the same manner.

The web app may also be used by administrators to manage users and set preferences such as thresholds for alerts. Additionally, it can be used to send alerts or messages directly to portable devices.

Figure 2:
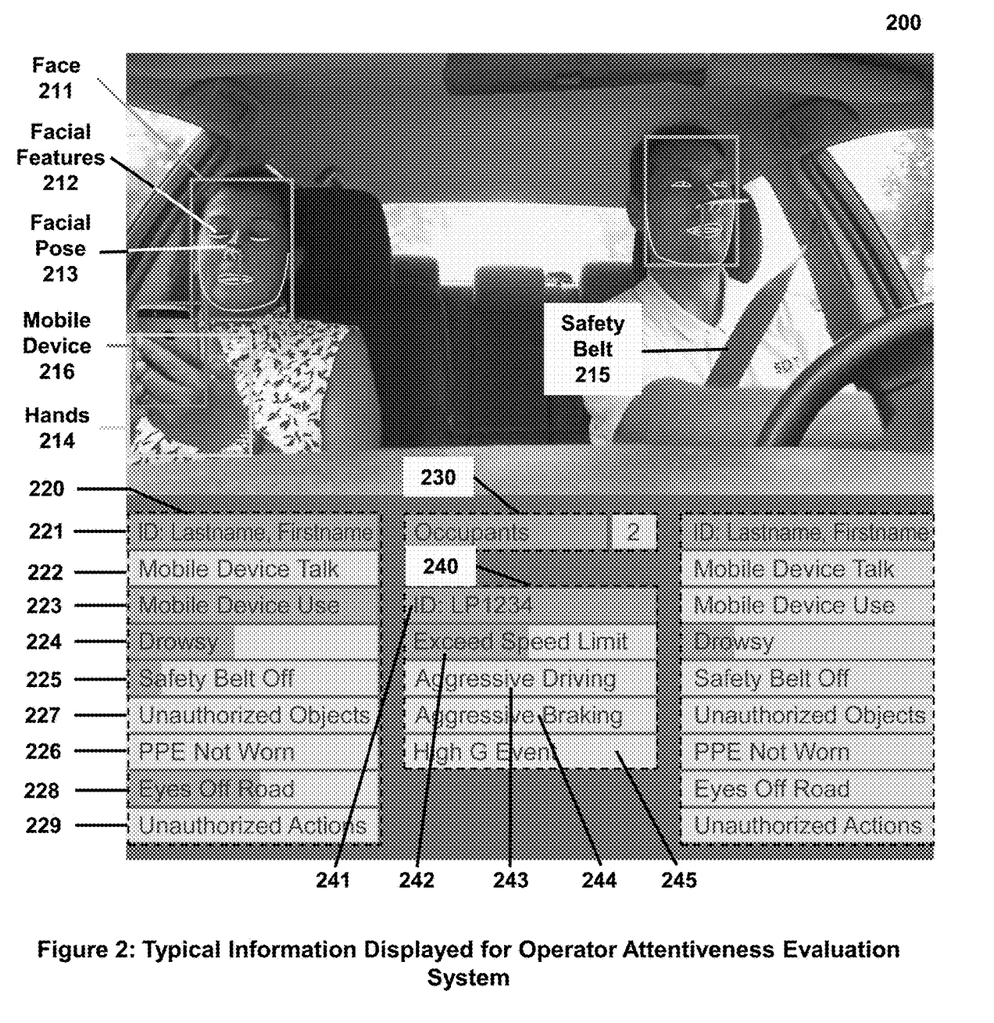
FIGS. 2 and 3 show examples of displays of a web frontend of the operator behavior monitoring system of FIG. 1, in use.

FIG. 2 illustrates a typical view of the information that is displayed for the operator behavior monitoring system. The following will be applicable to all operators in the vehicle cabin or in the scene. Machine learning and computer vision algorithms are used to determine the following.

Each operator's (or occupant's) face (211), facial features (212), face pose (gaze direction) (213) and hands (214) are detected and tracked. Mobile devices (216) are detected and tracked. The presence of safety belts (seat belts) (215) are detected.

Operator event status is shown in an operator status box (220). This includes the identification (221) of the operator, whether the operator is talking on a mobile device (222), whether the operator is using a mobile device (223) (e.g. for texting, reading, watching videos and the like), whether the operator is drowsy (224), whether the operator is wearing his/her safety belt (seat belt) (225), whether the operator is wearing his/her personal protective equipment (PPE) (226), whether the operator has his/her hands near their faces (227) (often indicating unsafe behavior such as putting on make-up while driving), whether the eyes of the operator are on the road (228) and whether the operator is wearing dark glasses (229).

Facial recognition algorithms are used to determine the identity (221) of the operator. Convolutional neural networks (CNNs) are also used to determine the gender and approximate age of the operator.

The hands near face (227) parameter is further broken down to include operator events such as, but not limited to, whether the operator is smoking, drinking, eating, putting on makeup or scratching his/her head.

Operator status is shown for each parameter by means of a dynamic bar chart. If the operator does something (whether desirable or non-desirable, the box of the relevant parameter will fill up, from left to right, in red (or any other desirable color). A box that is partially filled in red, denotes a lower probability of the activity taking place. A box that is completely filled in red denotes a high probability that the relevant activity is taking place.

The number of operators in the vehicle (or scene) is shown in the occupant number box (230).

Vehicle status is shown in a vehicle status box (240). This includes the identification of the vehicle (241) (for example license plate number), whether the speed limit has been exceeded (242), whether the vehicle is driven aggressively (243), whether the vehicle is decelerated aggressively (244), or whether a high G event (245) has occurred, e.g. a collision or an accident.

Figure 3:
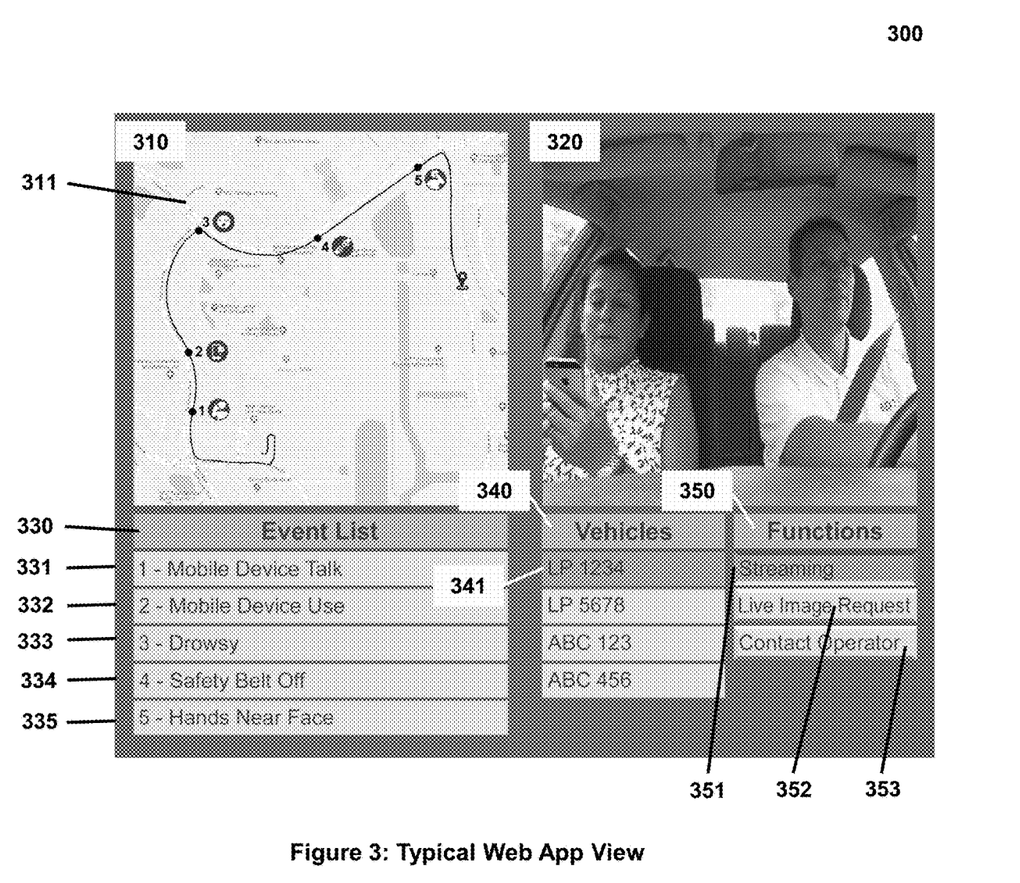

FIG. 3 illustrates another example of the information that is displayed for the operator behavior monitoring system. The web app view includes a map view (310), a cab (or scene) view (320), an event list (330), an operator list (340) and a list of functions (350).

The map view (310) includes event icons (311), where the operators performed actions, such as, but not limited to, talking on a mobile device, texting on a mobile device, viewing a mobile device or becoming drowsy.

The cab (or scene) view (320) is a direct output from the camera that is aimed at the scene.

The event list (330) shows a list of recent events that have been triggered, such as, but not limited to, talking on a mobile phone (331), using a mobile phone (texting, reading, watching videos and the like) (332), operator becoming drowsy (333), safety belt (seat belt) not worn (334) and hands near face (335). The events are mapped (coupled) to the map view. If the user clicks on an event icon (311) the description of the event will be shown in the event list (330). The user could also click on an event in the event list (330) and the event icon (311) in the map view (310) will be highlighted.

The vehicle list (340) enables the user of the web app to select a vehicle (341) from the list, for viewing the vehicle's current or previous trips.

The web app also includes a functions section (350). The functions include, but are not limited to, streaming view (351), live image request (352) or contacting the operator (353).

If the streaming view (351) is selected, the view of the camera sensor will be displayed continuously. If the streaming view (351) is not selected a cab view will only be displayed when an event takes place. The user of the web app may also select a live image request (352) at any time. This function will then display a snap shot of the cab (or scene) view. The user of the web app may also select the contact operator (353) function. This function will enable to user to speak to the operator or to send alerts to the operator.

Figure 4:
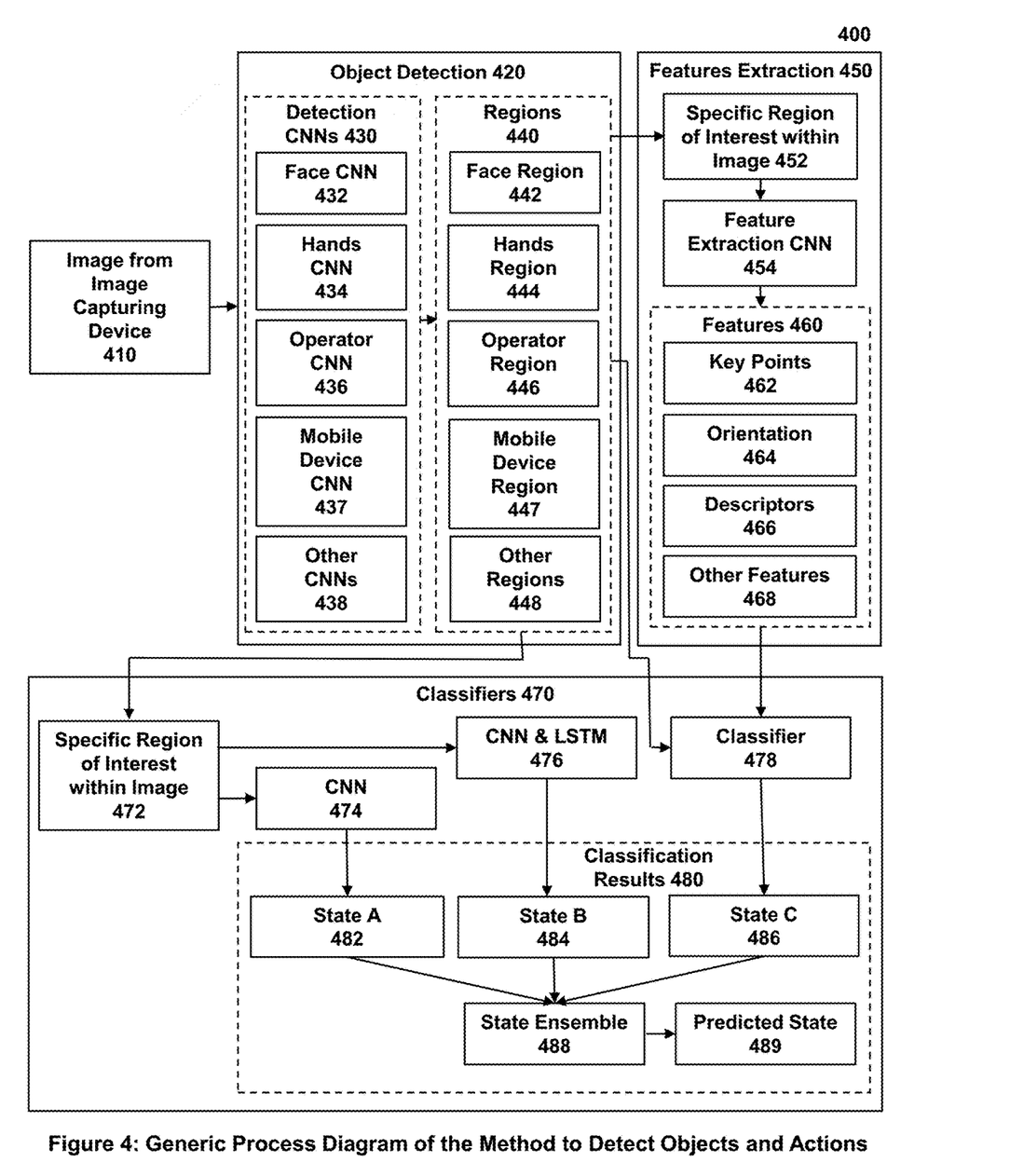
FIG. 4 shows a block diagram of a machine-implemented method for monitoring operator behavior in accordance with another aspect of the invention.

5. Detailed Description of the Machine-Implemented Method for Monitoring Operator Behavior FIG. 4 shows a data flow diagram illustrating the process for determining the state and/or action of an object using data extracted from digital images. An object can be an inanimate object or a living object such as a human or an animal. The image captured by the image capturing device is illustrated by (410).

Detection convolutional neural networks (CNNs) (430) are used to detect the regions (440) of objects of interest and is further described in 5.1. The image region containing a specific region of interest (452) is cropped from the input image (410) from which features are extracted as described in 5.2. Different classifiers (470) use the image data, objects detected and features (460) to classify the behavior of the object. The classifiers (480) are described in 5.3. The results of all the classifiers (480) are ensembled (combined) (488) as described in 5.4.

5.1 Object Detection (420)

A detection CNN takes an image as input and outputs the bounding region in 2-dimensional image coordinates for each class detected. Class refers to the type of the object detected, such as, but not limited to, face, hands and mobile device. Standard object detector CNN architectures exist such as You Only Look Once (YOLO) and Single Shot Detector (SSD).

The input image (410) is subjected to all the detection CNNs. Multiple detection CNNs (430) can be used (432, 434, 436, 437 and 438). Each detection CNN (430) can output the region of multiple detected objects which outputs the regions (440). For example, the face detection CNN (432) detects face bounding regions and outputs the region (442) of each face detected. The hands detection CNN (434) detects hand locations (444), while the operator detection CNN (436) detects the bounding region (446) of the operator. The mobile device CNN (437) detects mobile device regions (447). Other CNNs (438) detects the regions of other objects or entities (448).

5.2 Feature Extraction (450)

The image with a specific region of interest (472) is cropped from the original input image (410) by using the detected region of the object or entity from (440). Feature extraction CNNs (454) are used to determine the features (460) of the object. Features (460) include, but are not limited to, key points (462), orientation (464), descriptors (466) and other features (468) of an image region. Features (460) are detected by using one or more feature extraction CNNs (454).

5.3 Classifiers (470)

The object behavior is estimated by using three independent classifiers (474), (476) and (478). The classifiers can be used on their own or together with the other classifiers in any combination to obtain classification results (480). The results of each classifier (482, 484 and 486) are merged by means of a weighted sum ensemble (488).

Classifier (478) takes as input the detected object regions (440) provided by the detection CNNs (430) as well as features (460). Classification techniques used for classifier (478) include, but are not limited to, support vector machines (SVMs), neural networks, boosted classification trees, or other machine learning classifiers.

The classification CNN (474) is given the single image (472) of the object or entity as input and outputs a probability list for each behavior. This classifier determines the behavior by only looking at a single image.

The classification CNN (476) also receives the image (472) as input but works together with a long-term-short-term memory (LSTM) recurrent network. This classifier keeps a memory of previously seen images and uses that to determine the object state and actions with temporal features gathered over time.

5.4 Ensemble of Results

Each of the classifiers (474, 476 and 478) mentioned before in 4.3 can be used as an object, state or action classifier on its own. The accuracy of the classification is further improved by combining the classification results (482, 484 and 486) of all the classifiers. This process is called an ensemble (488) of results. The individual results are combined by a weighted sum where the weights are determined by optimizing the weights on the training dataset, to arrive at a final predicted state (489).

The applications of the system include, but are not limited to:

evaluation of drivers of trucks and cars;
evaluation of operators of machines (such as, but not limited to, mining and construction machines);
evaluation of pilots;
evaluation of occupants of simulators;
evaluation of participants of simulations;
evaluation of operators viewing video walls, screens or other objects;
evaluation of operators/persons viewing objects in shops;
evaluation of operators working in a mine, plant or factory, to determine if they are wearing their personal protective equipment (PPE);
and
evaluation of occupants of self-driving vehicles or aircraft, taxis or ride-sharing vehicles.

The inventor is of the opinion that the invention provides a new behavior monitoring system and a new machine-implemented method for monitoring operator behavior.

The principles described herein can be extended to provide the following additional features to the operator behavior recognition system and the machine-implemented method for automated recognition of operator behavior:

Drowsiness Detection
Eyes Off Road (EOR) Detection
Facial Recognition of Operators/Occupants
Safety Belt (Seat Belt) Detection
Mobile Device Usage Detection (including, but not limited to, speaking, texting and viewing)
Hands Near Face (HNF) Detection
Personal Protective Equipment (PPE) Detection
Hours of Service Logging
Unauthorized Actions Detection (including, but not limited to, smoking, eating, drinking and makeup application)
Unauthorized Occupant Detection
Number of Occupants Detection
Mirror Check Detection
Cargo Monitoring
Unauthorized Object Detection (including, but not limited to, guns or knives)

The invention claimed is:

1. An operator behavior monitoring system comprising:
an operator behavior recognition system comprising hardware including at least one processor, a data storage facility in communication with the processor and input/output interfaces in communication with the processor, the system being configured to implement a set of convolutional neural networks (CNNs) including:
an object detection group into which at least one image is received from an image source for detecting at least one object in the image and to delineate the object from the image for further processing;
a feature extraction group which extracts features of the at least one object detected by the object detection group, the features including key points, orientation, descriptors and other features of the at least one object;
a classifier group which assesses the features extracted by the feature extraction group and classifies the features into a predefined number of events, and which is operable to report the events to a remote computer,
wherein the classifier group includes one or both of:
a single image CNN of the at least one object; and/or
a single image CNN of the at least one object in combination with a long-term-short-term memory (LSTM) recurrent network, which keeps a memory of a series of previous images of the at least one object; and
wherein the classifier group includes an ensemble function to ensemble the outputs of the classifiers together with the output of the single image CNN of the at least one object together with the combination of the single image CNN and the LSTM recurrent network by a weighted sum of the classifiers where the weights are determined by optimizing the weights on the training dataset;
a server operable to communicate with the operator behavior recognition system for receiving predefined events detected by the operator behavior recognition system;
a database, in communication with the server, operable to store and retrieve detected operator incidents; and
a web front-end, in communication with the server, for interfacing with the server.

2. The operator behavior monitoring system as claimed in claim 1, wherein the classifier group is pre-trained with classifiers which takes as input a combination of objects detected by the object detection group to detect a number of predefined events.

3. The operator behavior monitoring system as claimed in claim 1, wherein an ensembled output of the ensemble function from the classifiers is used to detect a predefined event, which is indicative of operator behavior.

4. The operator behavior monitoring system as claimed in claim 3, wherein the predefined events includes one or more of:
mobile device use;
attentiveness and drowsiness;
hands near face detection;
eyes off road detection;
personal protective equipment (PPE) detection;
facial recognition of operators and/or occupants;
hours of service;
safety belt (seat belt) detection;
unauthorized occupant or operator detection;
number of occupants and/or operators detection;
unauthorized object detection;
mirror check detection;
unauthorized activity detection;
cargo monitoring; and/or
dark glasses detection.

5. The operator behavior monitoring system as claimed in claim 3, wherein the classifier group is pre-trained with classifiers which takes as input a combination of objects detected by the object detection group to detect a number of predefined events.

6. A machine-implemented method for monitoring operator behavior, the method comprising:
receiving onto an operator behavior recognition system via an input/output interface onto a processor at least one image from an image source, the operator behavior recognition system comprising hardware including at least one processor, a data storage facility in communication with the processor and one or more input/output interfaces in communication with the processor, the system being configured to implement a set of convolutional neural networks (CNNs) including:
an object detection group into which at least one image is received from an image source for detecting at least one object in the image and to delineate the object from the image for further processing;
a feature extraction group which extracts features of the at least one object detected by the object detection group, the features including key points, orientation, descriptors and other features of the at least one object;
a classifier group which assess the features extracted by the feature extraction group and classifying the features into a predefined number of events and which is operable to report the events to a remote computer;
processing the at least one image by the object detection group to detect at least one object in the image and to delineate the object from the image for further processing;
processing the at least one image of at least one object via the features extraction group to extract features of the at least one object processing an output from the feature extraction group via the classifier group to detect a number of predefined events and transmitting the predefined events to a server;
receiving, on the server, the predefined events detected by the operator behavior recognition system;
displaying one or more events detected by the operator behavior recognition system (detected events) on a web front-end, including determining probability associated with the one or more detected events and displaying the probability in a set of graphs indicating the probability of each of the one or more detected events; and
recording, on a database in communication with the server, data and the detected events.

7. The machine-implemented method for monitoring operator behavior as claimed in claim 6, wherein the step of displaying events detected by the operator behavior recognition system includes periodically recording the geolocation of the operator to determine a route of the operator and displaying a map of the route together with at least one marker on the route indicating the location at which an event was detected.

8. The machine-implemented method for monitoring operator behavior as claimed in claim 7, wherein the at least one marker includes one or both of a description of the event and/or a representation of the event.

9. The machine-implemented method for monitoring operator behavior as claimed in claim 8, wherein the predefined events include any one or more of:
mobile device use;
attentiveness and drowsiness;
hands near face detection;
eyes off road detection;
personal protective equipment (PPE) detection;
facial recognition of operators and/or occupants;
hours of service;
safety belt (seat belt) detection;
unauthorized occupant or operator detection;
number of occupants and/or operators detection;
unauthorized object detection;
mirror check detection;
unauthorized activity detection;
cargo monitoring; and/or
dark glasses detection.

10. The machine-implemented method for monitoring operator behavior as claimed in claim 7, wherein the classifier group is pre-trained with classifiers which takes as input a combination of objects detected by the object detection group to detect a number of predefined events.

11. The machine-implemented method for monitoring operator behavior as claimed in claim 6, wherein the classifier group includes an ensemble function to ensemble the outputs of the classifiers together with the output of the single image CNN of the at least one object together with the combination of the single image CNN and the LSTM recurrent network by a weighted sum of the classifiers where the weights are determined by optimizing the weights on the training dataset.

12. The machine-implemented method for monitoring operator behavior as claimed in claim 11, wherein the classifier group is pre-trained with classifiers which takes as input a combination of objects detected by the object detection group to detect a number of predefined events.

13. The machine-implemented method for monitoring operator behavior as claimed in claim 6, wherein the classifier group is pre-trained with classifiers which takes as input a combination of objects detected by the object detection group to detect a number of predefined events.

14. The machine-implemented method for monitoring operator behavior as claimed in claim 13, wherein the classifier group includes an ensemble function to ensemble the outputs of the classifiers together with the output of the single image CNN of the at least one object together with the combination of the single image CNN and the LSTM recurrent network by a weighted sum of the classifiers where the weights are determined by optimizing the weights on the training dataset.

15. The machine-implemented method for monitoring operator behavior as claimed in claim 6, wherein the step of displaying events detected by the operator behavior recognition system includes periodically recording the geolocation of the operator to determine a route of the operator.

16. A machine-implemented method for monitoring operator behavior, the method comprising:
receiving onto an operator behavior recognition system via an input/output interface onto a processor at least one image from an image source, the operator behavior recognition system comprising hardware including at least one processor, a data storage facility in communication with the processor and one or more input/output interfaces in communication with the processor, the system being configured to implement a set of convolutional neural networks (CNNs) including:
an object detection group into which at least one image is received from an image source for detecting at least one object in the image and to delineate the object from the image for further processing;
a feature extraction group which extracts features of the at least one object detected by the object detection group, the features including key points, orientation, descriptors and other features of the at least one object;
a classifier group which assess the features extracted by the feature extraction group and classifying the features into a predefined number of events and which is operable to report the events to a remote computer, wherein the classifier group is pre-trained with one or more classifiers which take as input a combination of objects detected by the object detection group to detect a number of predefined events, and wherein the classifier group includes an ensemble function to ensemble the outputs of the classifiers together with the output of the single image CNN of the at least one object together with the combination of the single image CNN and the LSTM recurrent network by a weighted sum of the classifiers where the weights are determined by optimizing the weights on the training dataset;
processing the at least one image by the object detection group to detect at least one object in the image and to delineate the object from the image for further processing;
processing the at least one image of at least one object via the features extraction group to extract features of the at least one object;
processing an output from the feature extraction group via the classifier group to detect a number of predefined events and transmitting the predefined events to a server;
receiving, on the server, the predefined events detected by the operator behavior recognition system;
displaying one or more events detected by the operator behavior recognition system (detected events) on a web frontend; and
recording, on a database in communication with the server, data and the detected events.

17. A The machine-implemented method for monitoring operator behavior, the method comprising:
receiving onto an operator behavior recognition system via an input/output interface onto a processor at least one image from an image source, the operator behavior recognition system comprising hardware including at least one processor, a data storage facility in communication with the processor and one or more input/output interfaces in communication with the processor, the system being configured to implement a set of convolutional neural networks (CNNs) including:
an object detection group into which at least one image is received from an image source for detecting at least one object in the image and to delineate the object from the image for further processing;
a feature extraction group which extracts features of the at least one object detected by the object detection group, the features including key points, orientation, descriptors and other features of the at least one object;
a classifier group which assess the features extracted by the feature extraction group and classifying the features into a predefined number of events and which is operable to report the events to a remote computer, wherein the classifier group includes an ensemble function to ensemble the outputs of the classifiers together with the output of the single image CNN of the at least one object together with the combination of the single image CNN and the LSTM recurrent network by a weighted sum of the classifiers where the weights are determined by optimizing the weights on the training dataset;
processing the at least one image by the object detection group to detect at least one object in the image and to delineate the object from the image for further processing;
processing the at least one image of at least one object via the features extraction group to extract features of the at least one object;

processing an output from the feature extraction group via the classifier group to detect a number of predefined events and transmitting the predefined events to a server;

receiving, on the server, the predefined events detected by the operator behavior recognition system;

displaying one or more events detected by the operator behavior recognition system (detected events) on a web frontend; and recording, on a database in communication with the server, data and the detected events.

18. The machine-implemented method for monitoring operator behavior as claimed in claim 17, wherein the classifier group is pre-trained with classifiers which takes as input a combination of objects detected by the object detection group to detect a number of predefined events.

19. A The machine-implemented method for monitoring operator behavior, the method comprising:

receiving onto an operator behavior recognition system via an input/output interface onto a processor at least one image from an image source, the operator behavior recognition system comprising hardware including at least one processor, a data storage facility in communication with the processor and one or more input/output interfaces in communication with the processor, the system being configured to implement a set of convolutional neural networks (CNNs) including:

an object detection group into which at least one image is received from an image source for detecting at least one object in the image and to delineate the object from the image for further processing;

a feature extraction group which extracts features of the at least one object detected by the object detection group, the features including key points, orientation, descriptors and other features of the at least one object;

a classifier group which assess the features extracted by the feature extraction group and classifying the features into a predefined number of events and which is operable to report the events to a remote computer, wherein the classifier group includes an ensemble function to ensemble the outputs of the classifiers together with the output of the single image CNN of the at least one object together with the combination of the single image CNN and the LSTM recurrent network by a weighted sum of the classifiers where the weights are determined by optimizing the weights on the training dataset;

processing the at least one image by the object detection group to detect at least one object in the image and to delineate the object from the image for further processing;

processing the at least one image of at least one object via the features extraction group to extract features of the at least one object;

processing an output from the feature extraction group via the classifier group to detect a number of predefined events and transmitting the predefined events to a server;

receiving, on the server, the predefined events detected by the operator behavior recognition system;

displaying one or more events detected by the operator behavior recognition system (detected events) on a web frontend; and recording, on a database in communication with the server, data and the detected events, wherein the database records all data being generated by the operator behavior recognition system.

20. The machine-implemented method for monitoring operator behavior as claimed in claim 19, wherein the classifier group is pre-trained with classifiers which takes as input a combination of objects detected by the object detection group to detect a number of predefined events.

* * * * *